United States Patent
Seidelberger

(10) Patent No.: US 11,353,050 B2
(45) Date of Patent: Jun. 7, 2022

(54) SYSTEM FOR HOLDING AT LEAST ONE OBJECT TO BE HELD IN A SHAFT-TYPE BUILDING STRUCTURE

(71) Applicant: Manfred Seidelberger, Nuremberg (DE)

(72) Inventor: Manfred Seidelberger, Nuremberg (DE)

(*) Notice: Subject to any disclaimer, the term of this patent is extended or adjusted under 35 U.S.C. 154(b) by 0 days.

(21) Appl. No.: 17/040,257

(22) PCT Filed: Mar. 18, 2019

(86) PCT No.: PCT/EP2019/056715
§ 371 (c)(1),
(2) Date: Sep. 22, 2020

(87) PCT Pub. No.: WO2019/179948
PCT Pub. Date: Sep. 26, 2019

(65) Prior Publication Data
US 2021/0010502 A1    Jan. 14, 2021

(30) Foreign Application Priority Data
Mar. 22, 2018   (DE) .......................... 102018106883.2

(51) Int. Cl.
*F16B 7/00* (2006.01)
*F16B 7/10* (2006.01)
(Continued)

(52) U.S. Cl.
CPC .................. *F16B 7/10* (2013.01); *E03F 7/02* (2013.01); *E04B 2001/405* (2013.01); *G01D 11/30* (2013.01)

(58) Field of Classification Search
None
See application file for complete search history.

(56) References Cited

U.S. PATENT DOCUMENTS

| 446,480 | A | * | 2/1891 | Stebbins | ................. E04F 10/02 160/81 |
| 704,403 | A | * | 7/1902 | Thill | ...................... H02G 3/125 248/200.1 |

(Continued)

FOREIGN PATENT DOCUMENTS

| DE | 2318733 A1 | 10/1974 |
| DE | 2835724 A1 | 2/1980 |

(Continued)

*Primary Examiner* — Steven M Marsh
(74) *Attorney, Agent, or Firm* — Rimon, P.C.

(57) ABSTRACT

A system for holding at least one object to be held in a shaft-type building structure, comprising: a holding device, which in turn comprises at least a first holding device element having a holding portion for holding the holding device on a shaft-type building structure and at least a second holding device element having a second holding portion for holding the holding device on a shaft-type building structure. The at least second holding device element is movably mounted between a first operating position, in which the holding device can be or is held on a shaft-type building structure by means of the second holding device element, and a second operating position, in which the holding device cannot be or is not held on a shaft-type building structure by means of the second holding device element.

12 Claims, 3 Drawing Sheets

Figure 1:
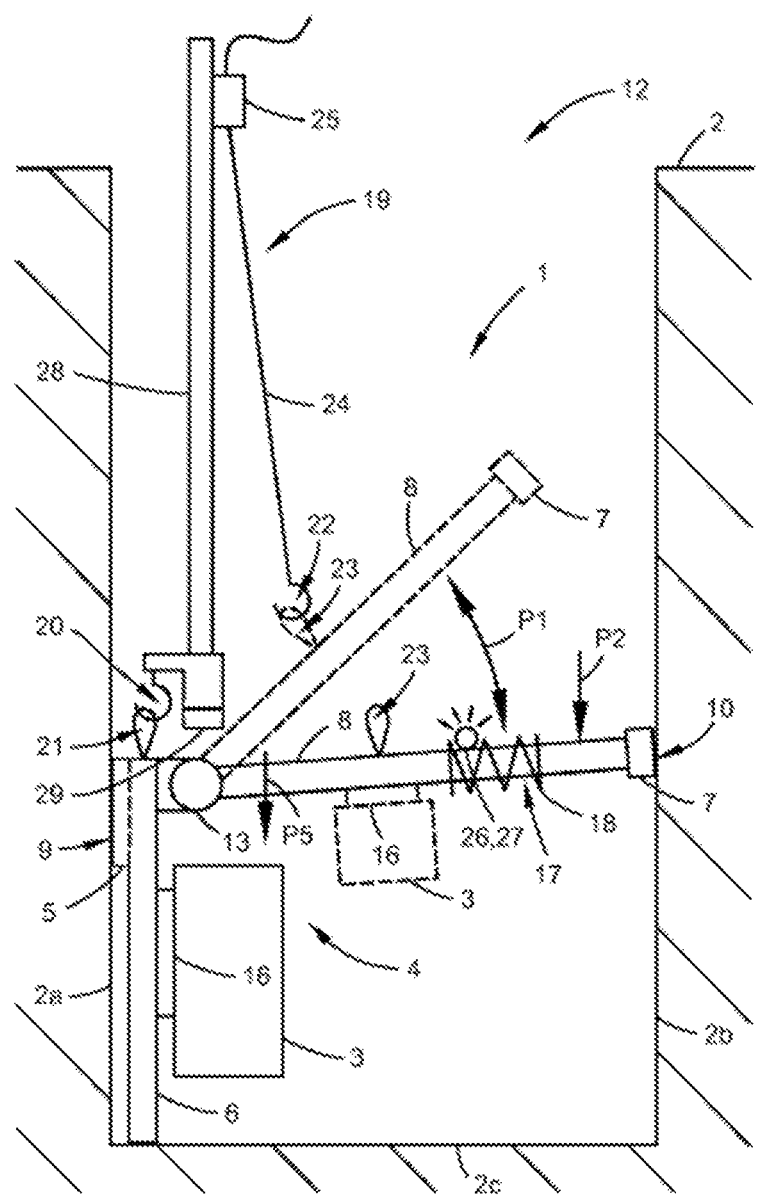

(51) Int. Cl.
  *E03F 7/02* (2006.01)
  *E04B 1/38* (2006.01)
  *G01D 11/30* (2006.01)

(56) References Cited

U.S. PATENT DOCUMENTS

| | | | | |
|---|---|---|---|---|
| 1,213,043 | A | * | 1/1917 | Harry .................. E04G 1/36 |
| | | | | 182/128 |
| 1,380,074 | A | | 5/1921 | Myers |
| 1,756,716 | A | * | 4/1930 | Whitney ............... A47H 1/022 |
| | | | | 211/123 |
| 1,809,401 | A | * | 6/1931 | Cattell .................. E04F 21/26 |
| | | | | 33/462 |
| 3,497,899 | A | | 3/1970 | Caperton |
| 5,688,087 | A | * | 11/1997 | Stapleton ............... B60P 7/15 |
| | | | | 410/143 |
| 6,009,975 | A | * | 1/2000 | Coenders ................ E04G 3/00 |
| | | | | 182/128 |
| 2003/0129027 | A1 | | 7/2003 | Navarrete et al. |
| 2003/0209642 | A1 | * | 11/2003 | Fontana ................. A63B 29/00 |
| | | | | 248/231.91 |

FOREIGN PATENT DOCUMENTS

DE   202007006970 U1   9/2007
DE   102015106847 A1   11/2015

\* cited by examiner

SYSTEM FOR HOLDING AT LEAST ONE OBJECT TO BE HELD IN A SHAFT-TYPE BUILDING STRUCTURE

CROSS-REFERENCE TO RELATED APPLICATIONS

This application claims priority to Patent Cooperation Treaty application serial number PCT/EP2019/056715, filed Mar. 18, 2019, which claims priority to German patent application serial number DE 10 2018 106 883.2, filed Mar. 22, 2018, the contents of each of which are incorporated herein by reference in their entirety.

The invention relates to a system for holding at least one object to be held in a shaft-type building structure.

Corresponding systems for holding at least one object to be held in a shaft-type building structure are basically known. The function of corresponding systems is that of holding objects to be held in a shaft-type building structure, e.g., in a sewer shaft forming part of a sewer system, in a stable manner in the respective shaft-type building structure. Corresponding systems are used, e.g., in the field of sewer technology, particularly sewer tunnel technology because objects are frequently to be held in such shaft-type building structures.

Up to now, corresponding systems have regularly been designed from a functional or constructive point of view such that holding an object in a shaft-type building structure, which is possible with the systems, is sometimes associated with considerable expenditures of labor and personnel. Specifically, holding objects to be held in a shaft-type building structure by means of conventional systems has to date regularly required a manual attachment of the respective objects in a shaft-type building structure, for which at least one person has to climb into the shaft-type building structure, attach the respective object, e.g., by screwing said object to the shaft-type building structure, which requires drilling into to the shaft-type building structure, and subsequently climb out again of the shaft-type building structure. Typically, a second person is required outside the shaft-type building structure, who supports and/or monitors the person in the shaft-type building structure when attaching the object to the shaft-type building structure.

Known systems are therefore in need of improvement with regard to enabling a technically and also economically efficient and, particularly, damage-free or non-destructive mounting of objects to be held in a shaft-type building structure.

The problem addressed by the invention is that of providing a system for holding at least one object to be held in a shaft-type building structure, which allows for the object to be held in the respective shaft-type building structure to be held efficiently.

The problem is solved by a system according to the present claim 1. The corresponding dependent claims relate to possible embodiments of the system.

The system described herein is used to hold at least one object to be held in a shaft-type building structure. By means of the system, one or more objects can thus be held in a shaft-type building structure. A mounting realized by means of the system is typically associated with a stable, i.e., particularly stationary or positionally fixed, attachment or assembly of a respective object on or in the shaft-type building structure, particularly with respect to forces acting from the outside, e.g., the pressure of water flowing or rising in the shaft-type building structure. The system is therefore used for fastening or mounting at least one object to be fastened or mounted on or in a shaft-type building structure.

A shaft-type building structure, hereinafter called "structure," for short, is typically a shaft structure (shaft) which is, at least in sections, particularly completely, vertically aligned. A corresponding structure typically comprises a number of wall sections which delimit an internal space. In principle, all types of structural forms come into consideration, e.g., structural forms with the same or different cross-sectional geometry, (cross-sectionally) round or angular structural forms, structural forms provided with landings, etc. A corresponding structure can be, e.g., an inspection, revision or installation shaft forming part of a sewer, energy, or other distribution network. A particular example of a shaft structure is a sewer tunnel shaft forming part of a sewer system carrying sewage.

An object to be held by means of the system can be provided with at least one technical functionality. An object can thus be designed as a, or comprise at least one, technical device provided with at least one technical functionality. The functionality of the object is typically determined by the structure, in which the object is to be held as intended; the object can therefore be provided with a functionality selected with regard to a specific structure or conditions prevailing therein. An object can therefore be used, e.g., for pest control, data acquisition, signal processing, or other functional tasks.

Accordingly, specific examples of objects are, e.g., detection devices comprising one or more detection elements, for example, sensor elements. Corresponding detection devices—including, e.g., measuring or sensor devices—can be designed to detect at least one chemical and/or physical parameter in the structure. Examples of corresponding detection devices are therefore detection devices for detecting the level, for example, the water level, of a fluid flowing through the structure, e.g. waste water, detection devices for detecting the chemical composition of a fluid flowing through the structure, i.e., a liquid or a gas, detection devices for detecting the temperature in the structure and/or of a fluid flowing through the structure, detection devices for detecting the pressure in the structure and/or of a fluid flowing through the structure, etc. A particular example of an object is a device for holding a bait (bait box). A corresponding system can comprise a housing part which can be inserted into a structure and which comprises at least one bait platform which delimits at least one through opening on the bait platform side, through which a pest, for example, a rodent, can reach a bait arranged in the housing part. A pipe closure device set up for an at least sectional, possibly complete, closure of a pipe can also be considered as a corresponding object. A corresponding pipe closure device can be designed, e.g., as a backwater valve device or at least include one such backwater valve device.

For holding a corresponding object, the system comprises a holding device. The holding device is the functional component of the system, which is designed for the actual holding of the at least one object to be held in a structure.

The holding device comprises a first holding device element comprising at least one first holding portion for holding the holding device on or in a structure and a second holding device element comprising at least one second holding portion for holding the holding device on or in a structure. The holding device elements or the associated holding portions thus allow for the holding device to be mounted on or in the structure. When the holding device is held in a structure as intended, the respective holding portions form at least one contact area, i.e., particularly a contact surface, with the structure, via which holding forces for holding the holding device (and the object attached to it) can be transmitted in the structure. Corresponding holding portions thus comprise at least one contact area which, when the holding device is held in a structure, bears against a wall section of the structure. By holding the holding device on or in a structure, it is possible to hold an object on or in the structure when the object can be or is fastened to the holding device, as will be described below. The object is therefore held on or in the structure indirectly via the attachment of the holding device on or in the structure.

The respective holding device elements can be, e.g., rod-like or strut-like elongated components. The first and/or the second holding device element can thus be designed in a rod-like or strut-like manner. The first and/or second holding device element can therefore be called or considered to be support rods or support struts.

At least the second holding device element is movably mounted between a first operating position, which can also be called or considered to be a holding position, in which the holding device can be or is held on or in a structure by means of the second holding device element, and a second operating position, which can also be called or considered to be a non-holding position, in which the holding device cannot be or is not held on or in a structure by means of the second holding device element. The first operating position of the second holding device element therefore allows for the holding device to be held in a stable manner in a structure, and the second operating position of the second holding device element does not allow for the holding device to be held in the structure.

In the first operating position of the second holding device element, a holding force holding the holding device in the structure can be exerted via the holding device. The holding force typically directed against the structure, particularly a tensioning force holding the holding device in the structure, which is why the first operating position of the second holding device element can also be called or considered to be the tensioning position, can have a different strength for different designs of the holding device; the strength of the holding force can be such, e.g., that the holding device (together with the object attached to it) is held in the structure so as to be arranged in a suspended manner. In any case, the holding force is so high that a stable holding of the holding device (together with the object attached to it) on or in a structure is possible. This also applies to cases, in which part of the holding device, e.g., the first holding device element, and/or the object is supported by a wall section of the structure, e.g., a bottom wall section of the structure.

In the first operating position, the second holding device element is typically moved relative to the structure, e.g., relative to a wall section of the structure, such that the holding device is held on or in the structure in a stable manner. In this case, the second holding device element is particularly moved against the structure, e.g., against a wall section of the structure, such that the holding device is held in a stable manner on or in the shaft-type structure. In the first operating position, the second holding device element is typically braced against the structure, e.g., against a wall section of the structure, such that the holding device is held on or in the structure in a stable manner. Particularly in the first operating position of the second holding device element, the first holding device element can naturally also be braced against the structure, e.g., against an (opposite) wall section of the structure. The holding device elements can therefore form a tensioning compound structure, by means of which the holding device can be braced or is braced in the structure.

The second holding device element can be moved, at least partially, without braking. Proceeding from the second operating position, the second holding device element thus accelerates in the downward movement into the first operating position due to its weight. When reaching a wall section of the structure, the second holding device element can be abruptly decelerated, and the acceleration energy released in the process can be partially converted into useful tension energy with a corresponding design of the tensioning compound structure. In this way, the holding device can, if necessary, already be brought into a stable holding position without the need to apply an additional force to increase the tensioning force on the tensioning compound structure.

The possibility of transferring, or the transfer of, at least the second holding device element to respective operating positions allows for an efficient assembly and disassembly of the holding device in a structure. If the holding device is to be mounted, at least the second holding device element is to be moved to the first operating position; if the holding device is to be disassembled, at least the second holding device element is to be moved to the second operating position. The basic principle of assembly and disassembly processes of the holding device is based on reducing the spatial expansion of the holding device when it is introduced into a structure so as not to have any (simultaneous) contact with opposing wall sections of the structure, and when the second holding device element reaches the first operating position, the spatial-physical extent of the holding device is increased in order to bring about this contact with said wall sections in a targeted manner in order to hold the holding device.

In all cases, the spatial-physical dimensions of the holding device in the second operating position of the second holding device element are reduced in comparison to the first operating position of the second holding device element such that the holding device can be introduced and/or extracted (removed) into a structure or from a structure via an access opening which allows, e.g., for an above-ground access to the structure. The second operating position of the second holding device element therefore allows for the holding device to be introduced and/or extracted (removed) easily and quickly into a structure or from a structure via an access opening that allows access to the structure. Typically, it is not necessary for a person to climb into the structure for such purpose. It is typically also not necessary for the holding device to be fastened to the structure by screwing it into place, which requires drilling into the structure; the mounting of the holding device is damage-free and non-destructive.

Overall, a system for holding at least one object to be held in a structure is present, which allows for an object to be held in a structure to be held efficiently.

For stabilizing the holding device, the first and/or second holding device element can comprise a plurality of holding portions, particularly arranged offset in a horizontal plane. Constructively, this could be implemented, e.g., such that a respective holding device element is designed as a cross member, the respective ends of which press against the wall sections of the structure in the assembled state of the system in a structure. For each of these cross members, there would then be several contact areas with the wall sections of the structure.

As mentioned above, the object can be fastened or is fastened to the holding device, i.e., to the first and/or second holding device element. For this purpose, at least one fastening interface can be arranged or formed on the first and/or second holding device element, which is designed to fasten at least one object to be held by means of the holding device. A fastening interface can allow for a mechanical, i.e., particularly a force-locking and/or form-locking, fastening of the object to a respective holding device element, for which purpose the fastening interface comprises at least one fastening element, e.g., a force-locking and/or form-locking element, which is designed to interact on the object with a corresponding fastening element, e.g., a corresponding force- and/or form-locking element, while forming an attachment of the object on the respective holding device element. Appropriate force- and/or form-locking elements can be, e.g., screw elements, i.e., screw bolts and screw seats, and/or snap-in elements, i.e., snap-in projections and snap-in seats.

Regardless of the specific type of attachment, the fastening interface is set up particularly for a (damage-free or non-destructive) detachable fastening of an object to a respective holding device element; the attachment of an object to the respective holding device element can therefore be reversed and restored as desired.

In connection with the moveable mounting of the second holding device element in or between respective operating positions, different but combinable embodiments are conceivable, wherein exemplary embodiments shall be described in more detail below. As mentioned above, the spatial-physical dimensions of the holding device in the second operating position of the second holding device element are reduced in comparison to the first operating position of the second holding device element such that the holding device can be introduced and/or extracted (removed) into a structure or from a structure via an access opening which allows for access to the structure.

According to a preferred exemplary embodiment, the second holding device element is pivotably mounted particularly relative to the first holding device element, wherein a first pivot position of the second holding device element correlates with the first operating position of the second holding device element, and a second pivot position of the second holding device element correlates with the second operating position of the second holding device element. In this embodiment, the holding device thus typically comprises a pivot device formed, e.g., by a pivot joint or at least comprising such a pivot joint, by means of which a pivotable mounting of the second holding device element relative to the first holding device element is possible. The second holding device element can therefore be called or considered to be a pivotably mounted boom which is pivotably mounted relative to the first holding device element. In the first pivot position, the second holding device element can assume an angle of, e.g., approximately 90° relative to the first holding device element, and in the second pivot position, it can assume an angle greater or smaller than 90°, e.g., an angle of more than 100° or less than 80°, relative to the first holding device element. It is also conceivable that the second holding device element in the first pivot position assumes an angle greater than 90°, e.g., an angle of approximately 110°, relative to the first holding device element, and in the second pivot position, it assumes an angle greater or smaller than 110°, e.g., an angle of more than 120° or (significantly) less than 100°, relative to the first holding device element. The angles of the second holding device element in the first pivot position depend particularly on the specific type of attachment of the holding device, i.e., particularly on the fact whether this is done by bracing or wedging. This embodiment is typically accompanied by a bracing of the holding device in the structure; the fastening of the holding device in the structure is therefore typically carried out by bracing the holding device in the structure.

According to a further exemplary embodiment, the holding device can comprise at least two holding device elements, particularly designed like an articulated leg, wherein the at least two holding device elements are pivotably mounted relative to one another, particularly by means of at least one joint device coupling in an articulated manner, wherein a first pivot position of the holding device elements correlates with the first operating position of the second holding device element, and a second pivot position of the holding device elements correlates with the second operating position of the second holding device element. In this embodiment, the holding device thus typically comprises a joint device, formed by or at least comprising, e.g., a toggle joint, by means of which a pivotable mounting of the holding device elements, coupled in an articulated manner, relative to one another is possible. The holding device elements can therefore be called or considered to be pivotably mounted booms which are pivotably mounted relative to one another. In the first pivot position, the holding device elements can form an angle of, e.g., approximately 180°, and in the second pivot position, they can form an angle greater or smaller than 180°, e.g., an angle of more than 190° or less than 170°. This embodiment is typically accompanied by a wedging of the holding device in the structure; the fastening of the holding device in the structure is therefore typically carried out by wedging the holding device in the structure.

According to a further exemplary embodiment, the second holding device element can comprise at least two, particularly telescopically arranged or designed, holding device element segments, wherein one holding device element segment is movably mounted relative to at least one further holding device element segment, particularly telescopically, between an extended position and a retracted position, wherein the extended position correlates with the first operating position of the second holding device element, and the retracted position correlates with the second operating position of the second holding device element. In this embodiment, the holding device thus typically comprises an extension device which, e.g., is formed by or at least comprises a telescopic device, by means of which an extension and/or shortening of the second holding device element via a, typically linear, relative movement of a holding device element segment relative to a further holding device element segment, i.e., an extension and/or retraction of a holding device element segment, is possible. The second holding device element segment can thus be called or considered to be a telescopically mounted boom which is movably mounted relative to the first holding device element segment. It once again applies that the second holding portion is typically arranged or formed on the second holding device element segment. This embodiment is typically accompanied by a bracing of the holding device in the structure; the fastening of the holding device in the structure is therefore typically carried out by bracing the holding device in the structure.

In one or in the embodiment, in which the second holding device element comprises at least two, particularly telescopically arranged, holding device element segments, one holding device element segment can be movably mounted in a continuous manner, particularly telescopically, relative to at least one further holding device element segment. A holding device element segment can therefore be continuously movable relative to at least one further holding device element segment, e.g., it can be extendable in a telescopic manner. The length of the second holding device element can thus be varied as desired by a corresponding movement of a holding device element segment relative to at least one further holding device element segment. The second holding device element can thus be adjustable to different shaft dimensions, i.e., particularly to different inner diameter dimensions of a shaft.

A locking device can be or is assigned to the second holding device element, which is designed to lock and thus immobilize a or the holding device element segment movably mounted relative to at least one further holding device element segment in any position relative to at least one further holding device element segment. A corresponding locking device is therefore generally designed to generate a locking force that locks the holding device element segment, which is movably mounted relative to at least one further holding device element segment, in any position. A corresponding locking device can be designed as or at least comprise, e.g., a clamping or tensioning device. A corresponding clamping or tensioning device can specifically be designed as or at least comprise, e.g., a clamp or a clamping collar or a clamping sleeve.

Overall, this continuously lockable solution can be integrated into the setting process or into the movement sequence of the setting process. During a setting process, the length of the holding device elements, i.e., particularly the length of the second holding device element, can be adjusted to the desired extent (initially) without locking, e.g., by using a level, until shortly before the first operating position is reached, without knowing or measuring the shaft dimensions. Before the first operating position is reached, the holding device element segments and thus the entire system become a rigid part in order to be able to subsequently build up the necessary forces.

From the exemplary embodiments described above, it follows that the holding device can be fastened in the structure, particularly by bracing or wedging. The type of attachment typically influences the geometrical-constructive and structural design of the holding device or the holding device elements. If the holding device is braced, it is typically designed to be elastically flexible, i.e., it comprises at least one elastically flexible, i.e., particularly also compressible, braceable component, e.g., an elastically flexible or correspondingly designed holding device element. If the holding device is wedged, it is typically designed to be rigid, i.e., it comprises at least one rigid wedgeable component, e.g., a rigid or correspondingly designed holding device element.

As mentioned above, the embodiments can be combined with one another as desired. For example, a second holding device element pivotably mounted, particularly relative to the first holding device element, between a first and a second pivot position, wherein the first pivot position correlates with the first operating position of the second holding device element, and the second pivot position correlates with the second operating position of the second holding device element, can be combined with a second holding device element comprising at least two, particularly telescopically arranged or designed, holding device element segments, wherein an extended position of a holding device element segment correlates with the first operating position of the second holding device element, and a retracted position of the holding device element segment correlates with the second operating position of the second holding device element.

It applies to all embodiments that the system comprises a securing device assigned to the second holding device element or the second holding device element segment, which is designed to secure the second holding device element or the second holding device element segment in the second operating position or in an orientation corresponding to the second operating position. For this purpose, the securing device can comprise at least one securing element, e.g., a force- and/or form-locking element, arranged or formed, e.g., on the first holding device element or the first holding device element segment, which is designed to interact with a corresponding fastening element, e.g., a corresponding force- and/or form-locking element, on the second holding device element or the second holding device element segment while securing the second holding device element or the second holding device element segment in the second operating position. Appropriate force- and/or form-locking elements can be, e.g., snap-in elements, e.g., snap-in projections and snap-in seats.

It also applies to all embodiments that the first and/or the second holding portion can be provided with a surface or a (three-dimensional) surface structuring that increases the holding force that holds the holding device in the structure. Both principles aim to increase the friction between the respective holding portion and the structure. A corresponding surface or surface structuring can therefore be formed, e.g., by a friction lining or a toothing in the area of the contact area of the holding portion contacting the structure. With the same objective, the first and/or the second holding portion can also be adapted to a specific shaping of a wall section of the structure.

It further applies to all embodiments that at least one tensioning device can be assigned, possibly additionally, to the second holding device element, which is designed to generate or increase a tensioning force that braces the second holding device element against a structure in the first operating position. The effective direction of the tensioning force typically corresponds to the effective direction of the holding force that can be exerted by means of the holding device, so that the tensioning force increases the holding force. The aforementioned tensioning compound structure can therefore additionally comprise a separate tensioning device which allows for the absorption or release of tensioning forces. The tensioning device can be designed as or at least comprise, e.g., a tension spring. A corresponding tension spring can be guided or held to be compressible in the tensioning direction and to be rigid in all other directions. Specifically, the tension spring can be designed, e.g., as a helical spring which, at least in sections, surrounds or is integrated in the second holding device element; as mentioned above, said second holding device element is particularly a rod-like or strut-like elongated component.

The second holding device element can have at least one opening (reach-through opening) creating a reach-through possibility for an object to be held by means of the holding device and/or for an actuating element, particularly an actuating tool, for actuating a functionality of an object held by means of the holding device. A corresponding opening improves the handling of the system, particularly in connection with the introduction and/or extraction (removal) of an object into or from the structure or with corresponding actuations of functionalities of an object. A corresponding opening can be formed, e.g., by a recess in the second holding device element or an at least sectionally segmented, e.g., ring-, diamond- or V-shaped, formation of the second holding device element, wherein an opening creating a corresponding passage option can be formed by a, e.g., ring-, diamond- or V-shaped, internal space extending between respective holding device element segments.

In addition to the holding device, the system can comprise a setting device which is designed to introduce or insert the holding device into a structure. The setting device can also be designed to extract or remove the holding device from a structure. The setting device can particularly be designed to transfer the second holding device element to the first and/or second operating position. The setting device can, e.g., engage in the holding device, i.e., particularly the second holding device element, such that it can be moved to the first and/or second operating position. The setting device can also be designed to introduce the force that increases the tensioning force into the second holding device element. This can be achieved, e.g., by applying a compressive or tensile force, e.g., by a pushing or pulling process, to the second holding device element.

The setting device typically comprises at least one first coupling element forming part of a first coupling interface for a, particularly (damage-free or non-destructive) releasable, coupling of the setting device to the holding device. Correspondingly, the holding device typically comprises at least one first counter-coupling element forming part of a first counter-coupling interface corresponding to the coupling interface on the side of the setting device.

The setting device can furthermore comprise at least one second coupling element, which forms part of a second coupling interface, for a, particularly (damage-free or non-destructive) releasable, coupling of the setting device to the holding device. Correspondingly, the holding device can comprise at least one second counter-coupling element which forms part of a second counter-coupling interface corresponding to the second coupling interface on the side of the setting device.

A respective first or second coupling element on the side of the setting device can be arranged or formed on a pressure or tension element, e.g., a band, a chain, a rope, etc., forming part of a pressure or pulling device on the side of the setting device, via which—e.g., in the state coupled with a counter-coupling element on the side of the holding device—a compressive or tensile force can be exerted which acts on the holding device, i.e., particularly the second holding device element. By exerting a corresponding compressive or tensile force, the second holding device element can be moved, e.g., to the first or second operating position. A guide device can be assigned to the pressure or tension element, by means of which the pressure or tension element is guided at least in sections in a defined orientation relative to the setting device.

The guide device can also be designed to clamp the pressure or tension element. The clamping process of the pressure or tension element can be initiated and reversed by a user. For example, an embodiment is conceivable, in which the pressure or tension element is clamped via a spring system in the guide device and the clamping is disabled manually by a user via an actuating element for a movement of the second holding device element.

A respective coupling element on the side of the setting device can interact, e.g., mechanically, i.e., particularly in a form- and/or force-locking manner, and/or magnetically, with a respective counter-coupling element on the side of the holding device. A coupling element on the side of the setting device can be, e.g., an engagement element which is designed to engage in a receiving element. A counter-coupling element on the side of the holding device can accordingly be a receiving element, in which a corresponding engagement element can engage. A reverse configuration is naturally also conceivable. According to a first exemplary embodiment, a coupling element on the side of the setting device can therefore be, e.g., a hook-like hook element, which is designed to engage in a loop- or eye-like loop or eye element. A counter-coupling element on the side of the holding device can accordingly be a loop- or eye-like loop or eye element, in which a corresponding hook element can engage. A reverse configuration is naturally also conceivable. According to a second exemplary embodiment, a coupling element on the side of the setting device can be, e.g., a snap-in projection-like snap-in element which is designed to lockingly engage in a snap-in seat-like counter-snap-in element. A counter-coupling element on the side of the holding device can accordingly be a snap-in seat-like counter-snap-in element, in which a corresponding snap-in element can engage in a locking manner. A reverse configuration is naturally also conceivable.

A coupling element on the side of the setting device can be, e.g., a (permanent-)magnetic or magnetizable magnetic element, which is designed to interact magnetically attractively with a magnetic or magnetizable counter-magnetic element. A counter-coupling element on the side of the holding device can accordingly be a (permanent-)magnetic or magnetizable counter-magnetic element which interacts magnetically attractively with a corresponding magnetic element on the side of the setting device.

The setting device can comprise a rod-like or strut-like, optionally, particularly telescopically, extendable setting device element, on which at least the at least one first and/or second coupling element is or are arranged or formed.

The setting device can generally also be regarded as a subject matter of the invention separate from the system.

The system can include a detection device which is designed to detect the first and/or second operating position of the second holding device element and to generate detection information describing the first and/or second operating position of the second holding device element. The detection device can detect the first and/or second operating position of the second holding device element, e.g., by means of a spatial alignment of the second holding device element, by means of a force acting on the second holding device element, etc. Corresponding detection information can be output via an output device assigned to the detection device. The output of corresponding detection information comprises an actual output of acoustic and/or optical and/or haptic signals as well as a transmission of corresponding detection information to an external device, e.g., a data processing device equipped with a corresponding transmission interface, which is designed to process data of the detection information. The external device can be, e.g., a mobile terminal, such as a laptop, smartphone, smart watch, tablet PC, etc., and/or a network storage (cloud storage).

A user can be informed via appropriate detection information whether the force against the holding device introduced by said user, e.g., by actuating the setting device, is sufficient to achieve the required holding force. With the detection information generated by the detection device integrated in the tensioning compound structure, which can signal when a desired and required force is reached, a user is able to dose the pressing process of the setting device accordingly and, if necessary, to adjust it immediately. This can ease overuse of the tensioning compound structure and also facilitate the disassembly.

A further example of a corresponding detection device can be a level arranged or formed in a receiving device provided for this purpose that can be or is fastened to the second holding device element, by means of which an alignment of the second holding device element relative to the first holding device element can be recognized. The receiving device can have a receiving body or bearing body with a receiving body or bearing body section oriented at an incline with respect to a horizontal reference plane at a specific angle, e.g., at an angle of 10°. The specific angle typically results from an intended angular alignment of the second holding device element, particularly relative to the first holding device element, in the first operating position. In the receiving body or bearing body section, a receiving or bearing option for the level can be formed, which is realized, e.g., by a recess. The level is therefore also aligned to be inclined at the specific angle with respect to the horizontal reference plane. The gas bubble located in the level is thus centered when the second holding device element is in the intended angular alignment in the first operating position. In this way, a simple but extremely reliable detection of the first operating position is possible.

The invention also relates to a method for introducing a holding device according to the system into a structure, so that basically all statements in connection with the system apply analogously to the method. Conversely, all statements in connection with the method apply analogously to the system.

The method for introducing (inserting) a holding device according to the system into a structure comprises the following steps: Introducing a holding device into a structure, wherein the second holding device element of the holding device is moved to the second operating position, transferring the second holding device element from the second operating position to the first operating position, while forming an attachment of the holding device in the structure. An object to be held can already be held on the holding device or can be held subsequently, i.e., after the holding device has been introduced into the structure, i.e., particularly after the second holding device element has been transferred to the first operating position. The method can be carried out with a setting device as described, or the execution of the method can be facilitated with a setting device as described. The setting device can particularly be used to introduce the holding device into the structure and to transfer the second holding device element from the second operating position to the first operating position, e.g., by applying a corresponding compressive or tensile force to the second holding device element.

The invention also relates to a method for extracting (removing) a holding device according to the system from a structure, so that basically all statements in connection with the system apply analogously to the method. Conversely, all statements in connection with the method apply analogously to the system.

The method for extracting (removing) a holding device according to the system from a structure comprises the following steps: Transferring the second holding device element from the first operating position to the second operating position, while releasing an attachment of the holding device in the structure, removing the holding device from the structure, wherein the second holding device element of the holding device is moved to the second operating position. An object to be held can be held on the holding device or removed in advance, i.e., before the holding device is removed from the structure, i.e., particularly before the second holding device element is transferred to the second operating position. The method can be carried out with a setting device as described, or the execution of the method can be facilitated with a setting device as described. The setting device can particularly be used to transfer the second holding device element from the first operating position to the second operating position, e.g., by applying a corresponding compressive or tensile force to the second holding device element, and to remove the holding device from the structure.

The invention shall be explained using embodiments in the drawings.

Figure 2:
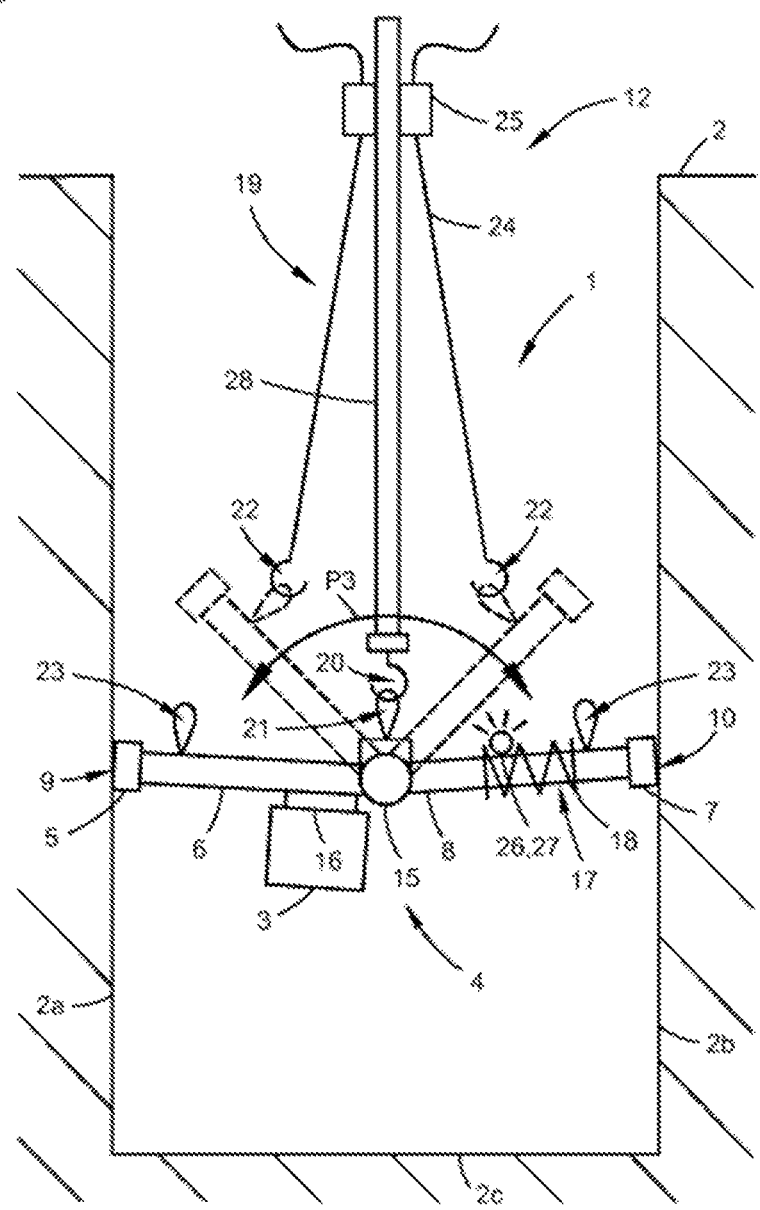
Figure 3:
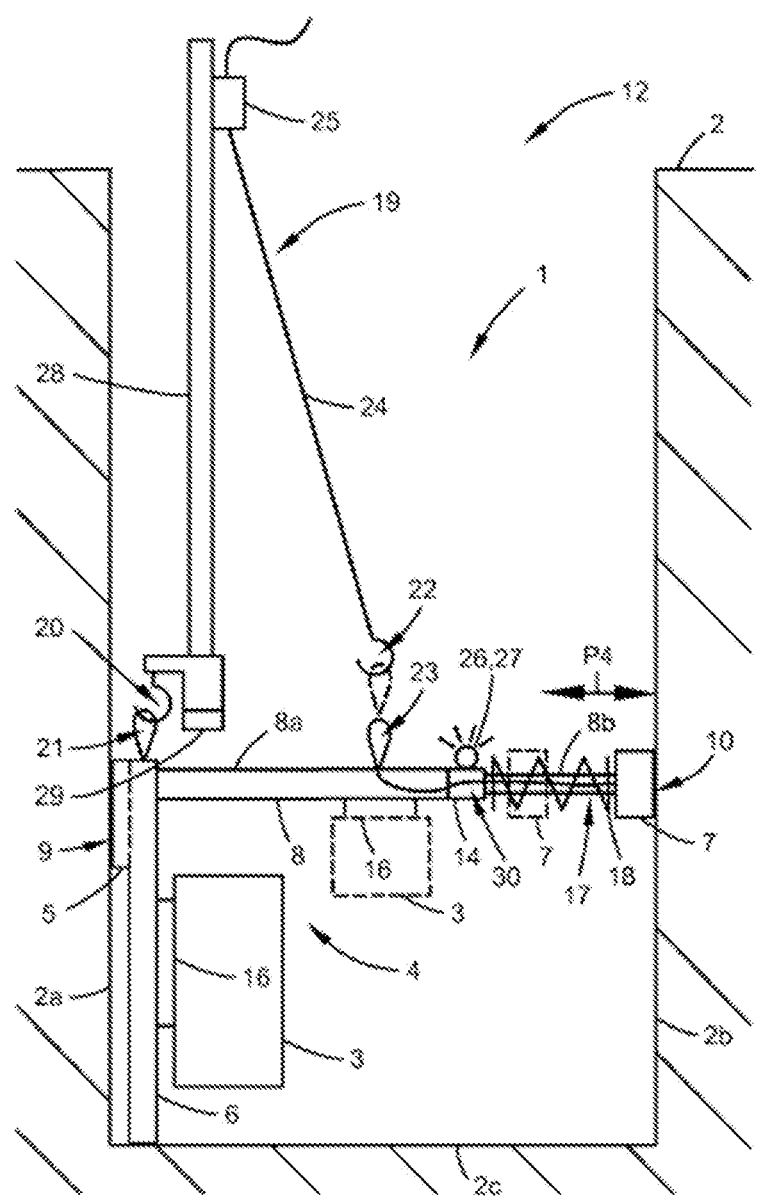

FIGS. 1-3 each show a schematic diagram of a device according to an embodiment.

FIG. 1 shows a schematic diagram of a system 1 for holding at least one object 3 to be held in a shaft-type structure 2, e.g., a sewer tunnel shaft forming part of a sewer system carrying waste water, according to a first embodiment.

The object 3 to be held by means of the system 1 is typically a technical device provided with at least one technical functionality. Specifically, the object 3 can be, e.g., a detection device, comprising one or more detection elements, e.g., sensor elements, for detecting at least one chemical and/or physical parameter in the structure 2, e.g., a detection device for detecting the level, e.g., the water level, of a fluid flowing through the structure 2, e.g., waste water, a detection device for detecting the chemical composition of a fluid flowing through the structure 2, i.e., a liquid or a gas, a detection device for detecting the temperature in the structure 2 and/or of a fluid flowing through the structure 2, a detection device for detecting the pressure in the structure 2 and/or of a fluid flowing through the structure 2, etc. A further example of an object 3 is a device for holding a bait (bait box). As a corresponding object 3, a pipe closure device designed to at least partially, or even entirely, close a pipe can also be taken into consideration. A corresponding pipe closure device can be designed, e.g., as a backwater valve device or at least include one such backwater valve device.

For holding a corresponding object 3, the system 1 comprises a holding device 4. The holding device 4 is the functional component of the system 1 and is designed to actually hold the object 3 to be held in the structure 2. In FIG. 1, a first exemplary possibility for holding an object 3 on the holding device 4 is indicated by a solid line, and a second exemplary holding possibility for an object 3 on the holding device 4 is indicated by a dashed line.

The holding device 4 comprises a first holding device element 6 comprising a first holding portion 5 for holding the holding device 4 on or in the structure 2 and a second holding device element 8 comprising a second holding portion 7 for holding the holding device 4 on or in the structure 2. The rod-like or strut-like holding device elements 6, 8 or the associated holding portions 5, 7 thus allow for the holding device 4 to be held on or in the structure 2. It can be seen in the embodiments shown in the drawings that, when the holding device 4 is in the intended held state in a structure 2, the respective holding portions 5, 7 form contact areas or surfaces 9, 10 with the structure 2 or corresponding (lateral) wall sections 2a, 2b of the structure 2, via which holding forces for holding the holding device 4 (together with the object 3 attached to it) in the structure 2 can be transmitted. The respective holding portions 5, 7 therefore each comprise a contact area 9, 10 which bears against a wall section 2a, 2b of the structure 2 when the holding device 4 is in the held state in the structure 2. By holding the holding device 4 on or in the structure 2, it is possible to hold an object 3 on or in the structure 2 when the object 3, as can be seen from the drawings, can be or is attached to the holding device 4.

The holding device 4 can be fastened in the structure 2 particularly by means of bracing (cf. embodiments according to FIGS. 1, 3) and/or wedging (cf. embodiment according to FIG. 2). For bracing, at least one component of the holding device 4 is or should be designed to be elastically flexible, i.e., particularly compressible, in order to ensure a reliable assembly and disassembly of the holding device 4. The respective holding portions 5, 7 can therefore be designed to be elastically flexible. This can be realized, e.g., by forming the holding portions 5, 7 from an elastically flexible material, e.g., an elastomer, or an elastically flexible material structure, e.g., a material structure comprising attenuation elements, such as recesses, openings, etc. For wedging, at least one component of the holding device 4 is or should be designed to be rigid, i.e., particularly not compressible, in order to ensure a reliable assembly and disassembly of the holding device 4. The respective holding portions 5, 7 can therefore be designed to be rigid. This can be realized, e.g., by forming the holding device elements 6, 8 and the holding portions 5, 7 from a rigid material, e.g., a metal or a hard plastic, or a rigid material structure, e.g., a material structure comprising, e.g., rib-like reinforcing elements.

Depending on the height, at which the holding device 4 is supposed to be after it has been introduced into the structure 2 and the weight of the holding device 4 (together with the object 3 attached to it), the first holding device element 6, as shown in FIG. 1, can or will be elongated such that it is additionally supported on the structure 2. Being supported on the structure 2, e.g., on a floor 2c of the structure 2, can be expedient if the holding device 4 is relatively heavy and the installation height is constant relative to the structure 2. Keeping the first holding device element 6 shorter and not supporting it on the structure 2 is advantageous if the holding device 4 is supposed to be kept relatively light and flexible in terms of the installation height relative to the structure 2.

At least the second holding device element 8 is movably mounted between a first operating position, which can also be called or considered to be a holding position (cf. solid line drawing), in which the holding device 4 can be or is held on or in the structure 2 by means of the second holding device element 8, and a second operating position, which can also be called or considered to be a non-holding position (cf. dashed line drawing), in which the holding device 4 cannot be or is not held on or in the structure 2 by means of the second holding device element 8. The first operating position of the second holding device element 8 thus allows for the holding device 4 to be held in the structure 2 in a stable manner, and the second operating position of the second holding device element 8 does not allow for the holding device 4 to be held in the structure 2.

In the first operating position of the second holding device element 8, a holding force holding the holding device 4 in the structure 2 can be exerted via the holding device 4, i.e., particularly via the second holding device element 8 or the second holding portion 7 assigned to the second holding device element 8. The holding force directed against the structure 2 or corresponding wall sections 2a, 2b of the structure 2, which in this case is a tensioning force holding the holding device 4 in the structure 2, and which is why the first operating position of the second holding device element 8 can also be called or considered to be the tensioning position, can be differently high for different designs of the holding device 4; the holding force can, e.g., be so high that the holding device 4 (together with the object 3 attached to it) is held in the structure 2 so as to be arranged in a suspended manner.

As shown, in the first operating position, the second holding device element 8 is moved relative to the structure 2, i.e., relative to a wall section 2b of the structure 2, such that the holding device 4 is held on or in the structure 2 in a stable manner. In the first operating position, the second holding device element 8 is, as mentioned above, braced against the structure 2, i.e., against a wall section 2b of the structure 2, such that the holding device 4 is held on or in the structure 2 in a stable manner. Typically, in the first operating position of the second holding device element 8, the first holding device element 6 is also braced against the structure 2, i.e., against an opposing wall section 2a of the structure 2. The holding device elements 6 thus form, particularly with the holding portions 5, 7, a tensioning compound structure, via which the holding device 4 can be braced or is braced in the structure 2.

The possibility of transferring or the transfer of at least the second holding device element 8 to respective operating positions allows for an efficient assembly and disassembly of the holding device 4 in the structure 2. If the holding device 4 is to be mounted, the second holding device element 8 must be moved to the first operating position; if the holding device 4 is to be disassembled, the second holding device element 8 must be moved to the second operating position. It is not necessary for the holding device 4 to be attached to the structure 2 by screwing it into the structure 2, which requires drilling; the mounting of the holding device 4 is free of damage or destruction.

It can be seen from the drawings that the spatial-physical dimensions of the holding device 4 in the second operating position of the second holding device element 8 are reduced in comparison to the first operating position of the second holding device element 8 such that it is possible to introduce and/or extract (remove) the holding device 4 into the structure 2 or from the structure 2 via an access opening 12, which allows, e.g., above-ground access to the structure 2. The second operating position of the second holding device element 8 therefore allows for the holding device 4 to be introduced and/or extracted (removed) easily and quickly into the structure 2 or from the structure 2 via the access opening 12 which allows access to the structure 2. It is not necessary for a person to climb into the structure 2 for this purpose.

According to the embodiment shown in FIG. 1, the second holding device element 8, as indicated by the double arrow P1, is pivotably mounted relative to the first holding device element 6, wherein a first pivot position (illustrated by a solid line) of the second holding device element 8 correlates with the first operating position of the second holding device element 8, and a second pivot position (illustrated by a dashed line) of the second holding device element 8 correlates with the second operating position of the second holding device element 8. In the embodiment shown in FIG. 1, the holding device 4 thus comprises a pivot device 13, formed by or at least comprising, e.g., a pivot joint, by means of which a pivotable mounting of the second holding device element 8 relative to the first holding device element 6 is possible. The second holding device element 8 can thus be called or considered to be a pivotably mounted boom which is pivotably mounted relative to the first holding device element 6. It can be seen that, in the first pivot position, the second holding device element 8 can assume an angle of, e.g., approximately 90° relative to the first holding device element 6, and in the second pivot position, it can assume an angle greater or smaller than 90°, e.g., an angle of more than 100° or less than 80°, relative to the first holding device element 6. However, it is also possible—this applies particularly (also) to the embodiment shown in FIG. 2—for the second holding device element 8 to assume an angle greater than 90° relative to the first holding device element 6 in the first pivot position.

FIG. 1 also shows a tensioning device 17 (optional) assigned to the second holding device element 8, which is designed to generate or increase a tensioning force that braces the second holding device element 8 against the structure 2 in the first operating position. The effective direction of the tensioning force corresponds to the effective direction of the holding force that can be exerted via the holding device 4, so that the tensioning force increases the holding force. The aforementioned tensioning compound structure can therefore additionally comprise a separate tensioning device 17 which allows for the absorption or release of tensioning forces. The tensioning device 17 can be designed as a tension spring 18 which can be compressed in the tensioning direction and is rigidly guided or held in all other directions. The tension spring 18 can specifically be designed as a helical spring which, at least in sections, surrounds or is integrated in the second holding device element 8.

The embodiment according to FIG. 1 is typically accompanied by bracing and/or wedging of the holding device 4 in the structure 2.

FIG. 1 also shows a setting device 19 which is designed to introduce or insert the holding device 4 into a structure 2 or for extracting or removing the holding device 4 from a structure 2. The setting device 19 can furthermore be designed to transfer the second holding device element 8 to the first and/or second operating position. The setting device 19 can, e.g., act on the holding device 4, i.e., particularly the second holding device element 8, such that it can be moved to the first and/or second operating position. The setting device 19 is typically also designed to introduce the force that increases the tensioning force into the second holding device element 8. This can be achieved, e.g., by applying a compressive or tensile force to the second holding device element 8. The compressive force can be introduced, e.g., by means of a pressure area 29 of the setting device 19, which is arranged or formed particularly in the area of a free end of the setting device 19.

The setting device 19 comprises a first coupling element 20, which forms part of a first coupling interface, for (damage-free or non-destructive) releasable coupling of the setting device 19 to the holding device 4, e.g., in the course of assembly or disassembly processes of the holding device 4. Correspondingly, the holding device 4 comprises a first counter-coupling element 21 which forms part of a first counter-coupling interface corresponding to the first coupling interface on the side of the setting device.

As can be seen, the setting device 19 can furthermore comprise a second coupling element 22, which forms part of a second coupling interface, for (damage-free or non-destructive) releasable coupling of the setting device 19 to the holding device 4. Correspondingly, the holding device 4 can comprise a second counter-coupling element 23 which forms part of a second counter-coupling interface corresponding to the second coupling interface on the side of the setting device. In the course of an assembly of the holding device 4, the setting device 19 typically interacts via the coupling element 20 with the first counter-coupling element 21 in order to introduce particularly the holding device 4 into the structure 2, and it interacts with the second counter-coupling element 23 in order to transfer particularly the second holding device element 8 to the first operating position by pivoting relative to the first holding device element 6. In the course of an assembly of the holding device 4, the setting device 19 typically interacts via the coupling element 20 with the second counter-coupling element 23 in order to transfer particularly the second holding device element 8 to the second operating position by pivoting relative to the first holding device element 6, and it interacts with the second counter-coupling element 23 or with the first counter-coupling element 21 in order to remove particularly the holding device 4 from the structure 2.

In the embodiment shown in FIG. 1, the second coupling element 22 on the side of the setting device is arranged or formed on a pressure or tension element 24, e.g., a band, a chain, a rope, etc., forming part of a pressure or pulling device on the side of the setting device, via which—e.g., in the state coupled with a counter-coupling element 23 on the side of the holding device—a compressive or tensile force can be exerted which acts on the holding device 4, i.e., particularly the second holding device element 8. By exerting a corresponding compressive or tensile force, the second holding device element 8 can be moved to the first or second operating position. A guide device 25 can be assigned to the pressure or tension element 24, by means of which the pressure or tension element 24 is guided at least in sections in a defined orientation relative to the setting device 19.

The guide device 25 can be designed to clamp the pressure or tension element 24. The clamping process of the pressure or tension element 24 can be initiated and reversed by a user. For example, an embodiment is conceivable, in which the pressure or tension element 24 is clamped via a spring system in the guide device 25 and the clamping is disabled manually by a user via an actuating element (not depicted) for a movement of the second holding device element 8.

A respective coupling element 20, 22 on the side of the setting device can interact, e.g., mechanically, i.e., particularly in a form- and/or force-locking manner, and/or magnetically, with a respective counter-coupling element 21, 23 on the side of the holding device. A coupling element 20, 22 on the side of the setting device can be—as shown in FIG. 1—an engagement element which is designed to engage in a receiving element. A counter-coupling element 21, 23 on the side of the holding device can accordingly be such a receiving element, in which a corresponding engagement element can engage. A reverse configuration is naturally also conceivable. In the embodiment shown in FIG. 1, a coupling element 20, 22 on the side of the setting device can therefore be, e.g., a hook-like hook element, which is designed to engage in a loop- or eye-like loop or eye element. A counter-coupling element 21, 23 on the side of the holding device can be, for example, a loop- or eye-like loop or eye element, in which a corresponding hook element can engage.

Although not shown in the drawings, a coupling element 20, 22 on the side of the setting device could also be, e.g., a snap-in projection-like snap-in element which is designed to lockingly engage in a snap-in seat-like counter-snap-in element. A counter-coupling element 21, 23 on the side of the holding device could accordingly be a snap-in seat-like counter-snap-in element, in which a corresponding snap-in element can engage in a locking manner.

A (permanent-)magnetic or magnetizable design of the respective coupling elements 20, 22 and counter-coupling elements 21, 23 would also be conceivable; a coupling element 20, 22 on the side of the setting device could thus be a (permanent-)magnetic or magnetizable magnetic element, which is designed to interact magnetically attractively with a magnetic or magnetizable counter-magnetic element. A counter-coupling element 21, 23 on the side of the holding device could accordingly be a (permanent-)magnetic or magnetizable counter-magnetic element which interacts magnetically attractively with a corresponding magnetic element on the side of the setting device.

The setting device 19 comprises a rod-like or strut-like, optionally, particularly telescopically, extendable setting device element 28, on which the first and/or second coupling element 20, 22 is or are arranged or formed.

FIG. 1 also shows an optional detection device 26 which is designed to detect the first and/or second operating position of the second holding device element 8 and to generate detection information describing the first and/or second operating position of the second holding device element 8. The detection device 26 can detect the first and/or second operating position of the second holding device element 8, e.g., by means of a spatial alignment of the second holding device element 8, by means of a force acting on the second holding device element 8, etc. Corresponding detection information can be output to a user via an output device 27 assigned to the detection device 26. The output of corresponding detection information comprises an actual output of acoustic and/or optical and/or haptic signals as well as a transmission of corresponding detection information to an external device (not depicted), e.g., a data processing device equipped with a corresponding transmission interface, which is designed to process data of the detection information. The external device can be, e.g., a mobile terminal, such as a laptop, smartphone, smart watch, tablet PC, etc., and/or a network storage (cloud storage).

A user can be informed via appropriate detection information whether the force, indicated by the arrow P2, against the holding device 4 introduced by said user, e.g., by actuating the setting device 19, is sufficient to achieve the required holding force. With the detection information generated by the detection device 26 integrated in the tensioning compound structure, which can signal when a desired and required force is reached, a user is able to dose the pressing or pulling process of the setting device 19 accordingly and, if necessary, to adjust it immediately. This can ease overuse of the tensioning compound structure and also facilitate the disassembly.

FIG. 2 shows a schematic diagram of a system 1 for holding at least one object 3 to be held in a shaft-type structure 2, e.g., a sewer tunnel shaft forming part of a sewer system carrying waste water, according to a second embodiment.

In the embodiment shown in FIG. 2, the holding device 4 comprises two holding device elements 6, 8, designed like an articulated leg, wherein the at least two holding device elements 6, 8 are pivotably mounted relative to one another, by means of at least one joint device 15 coupling in an articulated manner, as indicated by double arrow P3, wherein a first pivot position of the holding device elements 6, 8 correlates with the first operating position of the second holding device element 8, and a second pivot position of the holding device elements 6, 8 correlates with the second operating position of the second holding device element 8. The holding device 4 therefore comprises a joint device 15, formed by a toggle joint, by means of which a pivotable mounting of the holding device elements 6, 8, coupled in an articulated manner, relative to one another is possible. The holding device elements 6, 8 can therefore be called or considered to be pivotably mounted booms which are pivotably mounted relative to one another. As can be seen, the first holding portion 5 is arranged or formed on the first holding device element 6 and the second holding portion 7 is arranged or formed on the second holding device element 8. The two holding device elements 6, 8 are typically designed to be rigid, which allows for the holding device 4 to be wedged in the structure 2 in a stable manner.

The embodiment according to FIG. 2 is typically accompanied by wedging of the holding device 4 in the structure 2.

However, the tensioning device 17, which is also conceivable in this embodiment, ensures that, in the first operating position of the second holding device element 8, the holding portion 7 is pressed against the structure 2 and the required holding force for immobilizing the holding device 4 is achieved. In this respect, the embodiment can also be accompanied by a bracing of the holding device 4 in the structure 2. The same applies to the conceivable alternative or additional case of a corresponding tensioning device 17 assigned to the first holding device element 6.

FIG. 3 shows a schematic diagram of a system 1 for holding at least one object 3 to be held in a shaft-type structure 2, e.g., a sewer tunnel shaft forming part of a sewer system carrying waste water, according to a third embodiment.

In the embodiment shown in FIG. 3, the second holding device element 8 is designed to be segmented. The second holding device element 8 thus comprises two, particularly telescopically arranged or designed, holding device element segments 8a, 8b, wherein a second holding device element segment 8b is movably mounted relative to a first holding device element segment 8a, particularly telescopically, between an extended position and a retracted position, as indicated by the double arrow P4, wherein the extended position correlates with the first operating position of the second holding device element 8 and the retracted position correlates with the second operating position of the second holding device element 8. The holding device 4 thus comprises an extension device 14 formed by a telescopic device, by means of which an extension and/or shortening of the second holding device element 8 via a linear relative movement of a holding device element segment 8b relative to a further holding device element segment 8a, i.e., an extension and/or retraction of the second holding device element segment 8b, is possible. The second holding device element segment 8b can thus be called or considered to be a telescopically mounted boom which is movably mounted relative to the first holding device element segment 8a. As can be seen, the second holding portion 7 is arranged or formed on the second holding device element segment 8b.

The embodiment according to FIG. 3 is typically accompanied by a bracing of the holding device 4 in the structure 2.

As mentioned above, the object 3—this applies to all embodiments—can be or is attached to the holding device 4, i.e., to the first and/or second holding device element 6, 8. The attachment of the object 3 to the first and/or second holding device element 6, 8 is typically releasable in a damage-free or non-destructive manner. For this purpose, fastening interfaces 16 are arranged or formed on the first and/or second holding device element 6, 8, which are designed to fasten an object 3 to be held. A corresponding fastening interface 16 can allow for a mechanical, i.e., particularly a force-locking and/or form-locking, fastening of the object 3 to a respective holding device element 6, 8, for which purpose the fastening interface 16 comprises at least one fastening element (not depicted in detail), e.g., a force-locking and/or form-locking element, which is designed to interact on the object 3 with a corresponding fastening element (not depicted in detail), e.g., a corresponding force- and/or form-locking element, while forming an attachment of the object 3 on the respective holding device element 6, 8. Appropriate force- and/or form-locking elements can be, e.g., screw elements, i.e., screw bolts and screw seats, and/or snap-in elements, i.e., snap-in projections and snap-in seats.

It applies to all embodiments that the system 1 comprises a securing device 30 assigned to the second holding device element 8 or the second holding device element segment 8*b*, which is designed to secure the second holding device element 8 or the second holding device element segment 8*b* in the second operating position or in an orientation corresponding to the second operating position. For this purpose, the securing device 30, indicated by way of example in FIG. 3 and purely exemplary in the area of the extension device 14, can comprise at least one securing element, e.g., a force- and/or form-locking element, arranged or formed, e.g., on the first holding device element 6 or the first holding device element segment 8*a*, which is designed to interact with a corresponding fastening element, e.g., a corresponding force- and/or form-locking element, on the second holding device element 8 or the second holding device element segment 8*b* while securing the second holding device element 8 or the second holding device element segment 8*b* in the second operating position. Appropriate force- and/or form-locking elements can be, e.g., snap-in elements, e.g., snap-in projections and snap-in seats.

It also applies to all embodiments that the first and/or the second holding portion 5, 7 can be provided with a surface or a (three-dimensional) surface structuring that increases the holding force that holds the holding device 4 in the structure 2. A corresponding surface or surface structuring can be formed, e.g., by a friction lining or a toothing in the area of the contact area 9, 10 of a respective holding portion 5, 7 contacting the structure 2.

It also applies to all embodiments that the second holding device element 8 can have at least one opening (reach-through opening), indicated schematically by the arrow P5, creating a reach-through possibility for an object 3 to be held by means of the holding device 4 and/or for an actuating element, particularly an actuating tool, for actuating a functionality of an object 3 held by means of the holding device 4. A corresponding opening can be formed, e.g., by a recess in the second holding device element 8 or an at least sectionally segmented, e.g., ring-, diamond- or V-shaped, formation of the second holding device element 8, wherein an opening creating a corresponding passage option can be formed by a, e.g., ring-, diamond- or V-shaped, internal space extending between respective holding device element segments.

It also applies to all embodiments that, if the second holding device element 8, as shown by way of example in FIG. 3, comprises a first and a second holding device element segment 8*a*, 8*b*, the or a second holding device element segment 8*b* can be movably mounted relative to the or a first holding device element segment 8*a* in a continuous manner. The second holding device element segment 8*b* can thus be extendable, e.g., in a telescopic manner. The length of the second holding device element 8 can thus be varied as desired by a corresponding movement of the holding device element segment 8*b* relative to the first holding device element segment 8*a*. The second holding device element 8 can thus be adjustable to different shaft dimensions, i.e., particularly to different inner diameter dimensions of a shaft.

A locking device (not depicted) can be or is assigned to the second holding device element 8, which is designed to lock and thus immobilize the second holding device element segment 8*b* movably mounted relative to the first holding device element segment 8*a* in any position relative to the first holding device element segment 8*a*. A corresponding locking device is therefore generally designed to generate a locking force that locks the second holding device element segment 8*b* in any position. A corresponding locking device can be designed as or at least comprise, e.g., a clamping or tensioning device. A corresponding clamping or tensioning device can specifically be designed as or at least comprise, e.g., a clamp or a clamping collar or a clamping sleeve.

Overall, this continuously lockable solution can be integrated into the setting process or into the movement sequence of the setting process. During a setting process, the length of the holding device elements 6, 8, i.e., particularly the length of the second holding device element 8, can be adjusted to the desired extent (initially) without locking, e.g., by using a level, until shortly before the first operating position is reached, without knowing or measuring the shaft dimensions. Before the first operating position is reached, the holding device element segments 8*a*, 8*b* and thus the entire system become a rigid part in order to be able to subsequently build up the necessary forces.

A further example of a corresponding detection device can be a level (not depicted) arranged or formed in a receiving device (not depicted) provided for this purpose that can be or is fastened to the second holding device element 8, by means of which an alignment of the second holding device element 8 relative to the first holding device element 6 can be recognized. The receiving device can have a receiving body or bearing body with a receiving body or bearing body section oriented at an incline with respect to a horizontal reference plane at a specific angle, e.g., at an angle of 10°. The specific angle typically results from an intended angular alignment of the second holding device element 8, particularly relative to the first holding device element 6, in the first operating position. In the receiving body or bearing body section, a receiving or bearing option for the level can be formed, which is realized, e.g., by a recess. The level is therefore also aligned to be inclined at the specific angle with respect to the horizontal reference plane. The gas bubble located in the level is thus centered when the second holding device element 8 is in the intended angular alignment in the first operating position. In this way, a simple but extremely reliable detection of the first operating position is possible.

With the devices 1 shown in the drawings, a method for introducing a holding device 4 according to the system into a structure 2 can be implemented. The method comprises the following steps: Introducing a holding device 4 into a structure 2, wherein the second holding device element 8 of the holding device 4 is moved to the second operating position, transferring the second holding device element 8 from the second operating position to the first operating position, while forming an attachment of the holding device 4 in the structure 2. An object 3 to be held can already be held on the holding device 4 or can be held subsequently.

The method can be carried out with the setting device 19, or the execution of the method can be facilitated with the setting device 19. The setting device 19 can particularly be used to introduce the holding device 4 into the structure 2 and to transfer the second holding device element 8 from the second operating position to the first operating position, e.g., by applying a corresponding compressive or tensile force to the second holding device element 8, and to brace or wedge it in the structure 2.

Furthermore, with the systems 1 shown in the drawings, a method for extracting (removing) a holding device 4 according to the system from a structure 2 can be implemented. The method comprises the following steps: Transferring the second holding device element 8 from the first operating position to the second operating position, while releasing an attachment of the holding device 4 in the structure 2, removing the holding device 4 from the structure 2, wherein the second holding device element 8 of the holding device 4 is moved to the second operating position. An object 3 to be held can be held on the holding device 4 or removed in advance.

The method can be carried out with the setting device 19, or the execution of the method can be facilitated with the setting device 19. The setting device 19 can particularly be used to transfer the second holding device element 8 from the first operating position to the second operating position, e.g., by applying a corresponding compressive or tensile force to the second holding device element 8, and to remove the holding device 4 from the structure 2.

The invention claimed is:

1. System for holding at least one object to be held in a building shaft structure, comprising:
   a holding device, which in turn comprises at least a first holding device element having a holding portion for holding the holding device on the building shaft structure and at least a second holding device element having a second holding portion for holding the holding device on the building shaft structure, wherein
   at least the second holding device element is movably mounted between a first operating position, in which the holding device can be or is held on a building shaft structure by means of the second holding device element, and a second operating position, in which the holding device cannot be or is not held on the building shaft structure by means of the second holding device element, wherein the second holding device element— is pivotably mounted particularly relative to the first holding device element, wherein a first pivot position of the second holding device element—correlates with the first operating position of the second holding device element, and a second pivot position of the second holding device element correlates with the second operating position of the second holding device element;
   wherein the first or the second holding device elements are rods or struts;
   further comprising at least one fastening interface arranged or formed on the first or second holding device element for releasably fastening at least one object to be held in the building shaft structure;
   further comprising a setting device which can be or is assigned to the holding device for inserting the holding device into the building shaft structure; wherein the setting device comprises at least one first coupling element forming art of a first coupling interface for the, particularly releasable, coupling of the setting device to the holding device, and the holding device comprises at least one first counter-coupling element forming part of a first counter-coupling interface corresponding to the coupling interface on the side of the setting device;
   further comprising a pressure or pulling device on a side of the setting device, which comprises at least one pressure or tension element via which in the state coupled to a counter-coupling element, a compressive or tensile force can be exerted which acts on the second holding device element.

2. System according to claim 1, wherein the second holding device element comprises at least two holding device element segments, particularly designed like an articulated leg, wherein the at least two holding device element segments are pivotably mounted relative to one another, particularly by means of at least one joint device coupling in an articulated manner, wherein a first pivot position of the holding device element segments correlates with the first operating position of the second holding device element, and a second pivot position of the holding device element segments correlates with the second operating position of the second holding device element.

3. System according to claim 1, wherein the second holding device element comprises at least two, particularly telescopically arranged, holding device element segments, wherein one holding device element segment is movably mounted relative to at least one further holding device element segment, particularly telescopically, between an extended position and a retracted position, wherein the extended position correlates with the first operating position of the second holding device element, and the retracted position correlates with the second operating position of the second holding device element.

4. System according to claim 1, wherein the second holding device element comprises at least two, particularly telescopically arranged, holding device element segments, wherein one holding device element segment is movably mounted in a continuous manner, particularly telescopically, relative to at least one further holding device element segment.

5. System according to claim 3, further comprising at least one locking device which can be or is assigned to the second holding device element, which is designed to lock the holding device element segment movably mounted relative to at least one further holding device element segment in any position relative to at least one further holding device element.

6. System according to claim 1, wherein the first or the second holding portion is provided with a, particularly three-dimensional, surface structuring that increases a holding force that holds the holding device in the building shaft structure.

7. System according to claim 1, further comprising at least one tensioning device assigned to the second holding device element, which is designed to generate a tensioning force that braces the second holding device element against the building shaft structure in the first operating position.

8. System according to claim 1, wherein the setting device comprises at least one second coupling element, which forms part of a second coupling interface, for the, particularly releasable, coupling of the setting device to the holding device, particularly to the second holding device element.

9. System according to claim 1, wherein the setting device comprises a setting device element, on which at least the at least one first or second coupling element is arranged or formed.

10. System according to claim 1, further comprising a detection device which is designed to detect the first or second operating position of the second holding device element and to generate detection information describing the first or second operating position of the second holding device element.

11. Method for introducing a holding device of a system according to claim 1 into the building shaft structure, comprising the steps:
- introducing a holding device into the building shaft structure, wherein the second holding device element of the holding device is moved to the second operating position,
- transferring the second holding device element from the second operating position to the first operating position, while forming an attachment of the holding device in the building structure.

12. Method for removing a holding device of a system according to claim 1 from the building shaft structure, comprising the steps:
- transferring the second holding device element from the first operating position to the second operating position, while releasing an attachment of the holding device in the building shaft structure,
- removing the holding device from the building shaft structure, wherein the second holding device element of the holding device is moved to the second operating position.

* * * * *